(12) United States Patent
Cameron et al.

(10) Patent No.: US 6,430,897 B1
(45) Date of Patent: Aug. 13, 2002

(54) METHOD AND APPARATUS FOR BRAKING AN AGRICULTURAL FEED BAGGER

(75) Inventors: Daniel Alexander Cameron, Millet; Fred Philip George Pedersen, Innisfail, both of (CA)

(73) Assignee: Feedbagger Enterprises Ltd., Millet (CA)

( * ) Notice: Subject to any disclaimer, the term of this patent is extended or adjusted under 35 U.S.C. 154(b) by 0 days.

(21) Appl. No.: 09/452,248

(22) Filed: Dec. 1, 1999

(30) Foreign Application Priority Data

Nov. 10, 1999 (CA) .............................................. 2289381

(51) Int. Cl.[7] .................................................. B65B 1/04
(52) U.S. Cl. ............................. 53/436; 53/459; 53/527; 53/567; 53/576
(58) Field of Search ........................... 53/459, 436, 567, 53/527, 576; 114/73, 313

(56) References Cited

U.S. PATENT DOCUMENTS

| | | | |
|---|---|---|---|
| 5,140,802 A | 8/1992 | Inman et al. .................. | 53/459 |
| 5,297,377 A | 3/1994 | Cullen .......................... | 53/527 |
| 5,425,220 A | 6/1995 | Cullen .......................... | 53/527 |
| 5,464,049 A | 11/1995 | Cullen .......................... | 141/114 |
| 5,671,594 A | 9/1997 | Cullen .......................... | 53/567 |
| 5,775,069 A | 7/1998 | Cullen .......................... | 53/567 |
| 5,899,247 A * | 5/1999 | Cullen .......................... | 53/527 |
| 6,202,389 B1 * | 3/2001 | Inman .......................... | 53/567 |

* cited by examiner

Primary Examiner—John Sipos
(74) Attorney, Agent, or Firm—Davis & Bujold, P.L.L.C.

(57) ABSTRACT

A method and apparatus for braking an agricultural feed bagger includes the following steps. A first step involves providing an agricultural feed bagger having a frame. The frame includes a tunnel with an intake end for receiving material to be bagged and an output end adapted to receive an open mouth of an agricultural bag. A second step involves positioning a body at a remote end of a linkage which extends outwardly from the frame into a flow stream of agricultural feed entering the open mouth of the agricultural bag. The flow of agricultural feed acting against the body serves to slow the forward progress of the agricultural bagger, as the force exerted against the body is transmitted, via the linkage, to the frame.

22 Claims, 4 Drawing Sheets

METHOD AND APPARATUS FOR BRAKING AN AGRICULTURAL FEED BAGGER

FIELD OF THE INVENTION

The present invention relates to a method and apparatus for braking an agricultural feed bagger.

BACKGROUND OF THE INVENTION

The patents of Stephen R. Cullen of Versa Corporation teach that the density of agricultural feed in an agricultural feed bagger, can be controlled by placing a loop of cable in a flow stream of feed entering a bag. These teachings can be found in U.S. Pat. Nos. 5,297,377; 5,425,220; 5,464,049; and 5,671,594.

In U.S. Pat. No. 5,775,069, Cullen indicates that brakes positioned on wheels of an agricultural feed bagger do not provide sufficient resistance to the filling of the bag. In particular, wheel brakes tend to experience difficulties of slippage in wet field conditions. Cullen suggests that selective density control can be used to eliminate the need for an elaborate braking system.

SUMMARY OF THE INVENTION

The present invention relates to a method and apparatus for braking an agricultural feed bagger.

According to one aspect of the present invention there is provided a method for braking an agricultural feed bagger which includes the following steps. A first step involves providing an agricultural feed bagger having a frame. The frame includes a tunnel with an intake end for receiving material to be bagged and an output end adapted to receive an open mouth of an agricultural bag. A second step involves positioning a body at a remote end of a linkage which extends outwardly from the frame into a flow stream of agricultural feed entering the open mouth of the agricultural bag. The flow of agricultural feed acting against the body serves to slow the forward progress of the agricultural bagger, as the force exerted against the body is transmitted, via the linkage, to the frame.

According to another aspect of the present invention, there is provided a combination apparatus for braking an agricultural feed bagger. An agricultural feed bagger is provided having a frame that includes a tunnel with an intake end for receiving material to be bagged and an output end adapted to receive an open mouth of an agricultural bag. A body is positioned at a remote end of a linkage which extends outwardly from the frame into a flow stream of agricultural feed entering the open mouth of the agricultural bag. The flow of agricultural feed acting against the body serves to slow the forward progress of the agricultural bagger, as the force exerted against the body is transmitted, via the linkage, to the frame.

The braking system, as described above, is capable of taking the strain off the wheel brakes by providing a majority of the braking force. The remainder of the braking force can be applied through the wheel brakes, as required.

There are various types of linkages that can be used to secure the body to the frame of the agricultural feed bagger. Beneficial results have been obtained through the use of a tethering line. There is little that can go wrong with a tethering line. The tethering line tends to be self centering.

Although beneficial results may be obtained through the use of the invention, as described above, even more beneficial results may be obtained when means being provided to extend and retract the linkage. This alters the position of the body in the flow stream of agricultural feed. As the position of the body in the flow stream is altered, the force is altered. As a general rule, the farther the body is extended into the flow stream the greater the braking force that is applied.

The body at the remote end of the linkage can assume a wide variety of geometric shapes. In order to prevent voids in the feed from forming in the agricultural bag, it is preferred that the body have fins. The fins provide resistance, while still permitting the agricultural feed to pass the body. In contrast, a void might be created behind a solid body, depending upon the shape and configuration of the body.

The body must operate in a flow stream of agricultural feed entering the body. This being the case, it is preferred that steps be taken to improve the movement of the body in such flow stream. The body has a first end and a second end. It is preferred that the body diverge outwardly from the first end to the second end. When the body primarily consists of connected fins, it is preferred that each of the fins have a leading edge and a trailing edge, and that the fins diverge outwardly from the leading edge to the trailing edge. The preferred form of body is a configuration of fins forming a pyramidal or wedge shape.

Although beneficial results may be obtained through the use of the invention, as described above, even more beneficial results may be obtained when the fins have extendible and retractable fin extensions. This enables the amount of drag provided by the body to be increased, when required, by extending the fin extensions.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
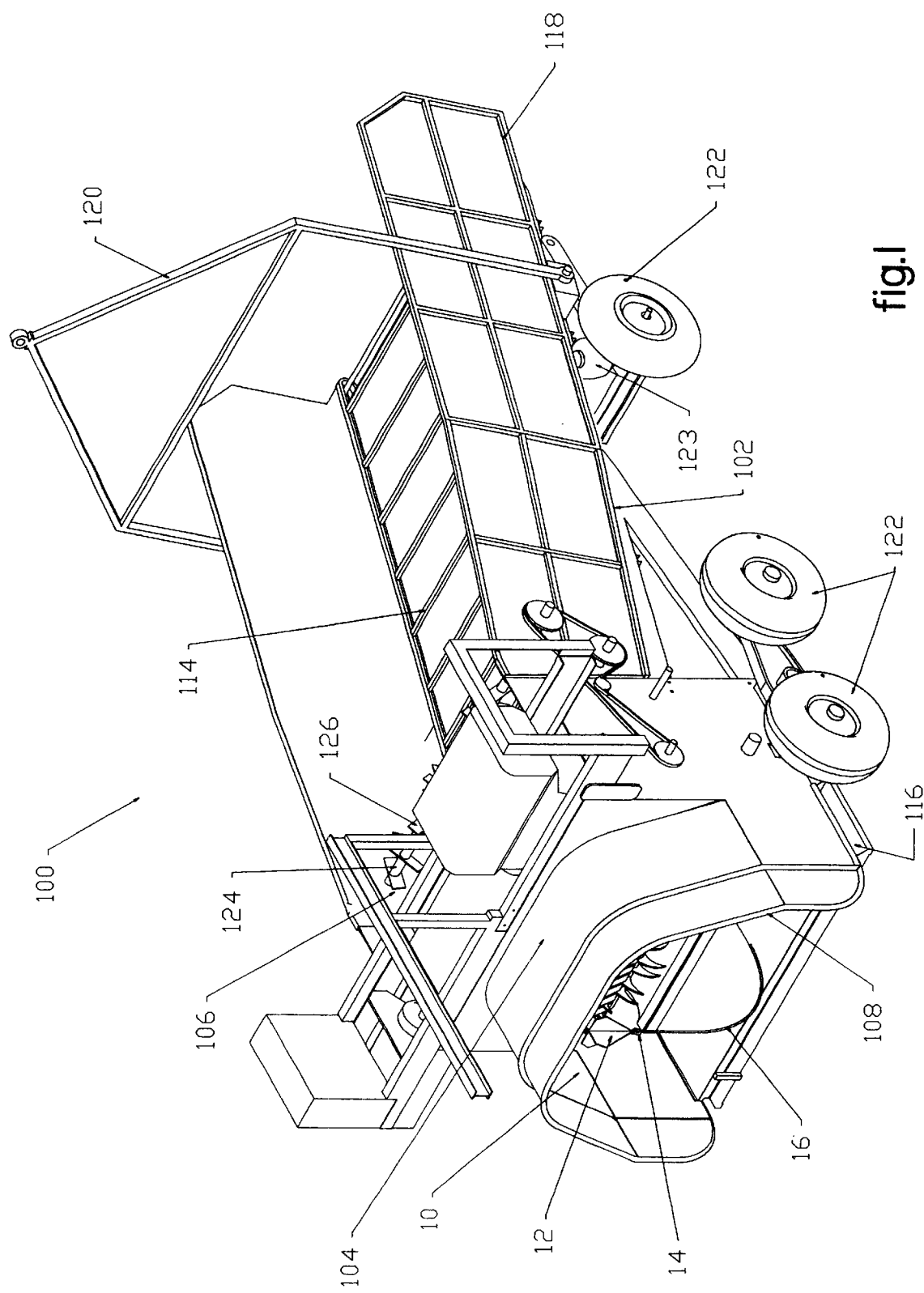
FIG. 1 is a perspective view of an agricultural feed bagger equipped with a braking apparatus constructed in accordance with the teachings of the present invention, with the braking apparatus in a transport position.

The preferred embodiment, an apparatus for braking an agricultural feed bagger, generally identified by reference numeral 10, will now be described with reference to FIGS. 1 through 4.

Figure 4:
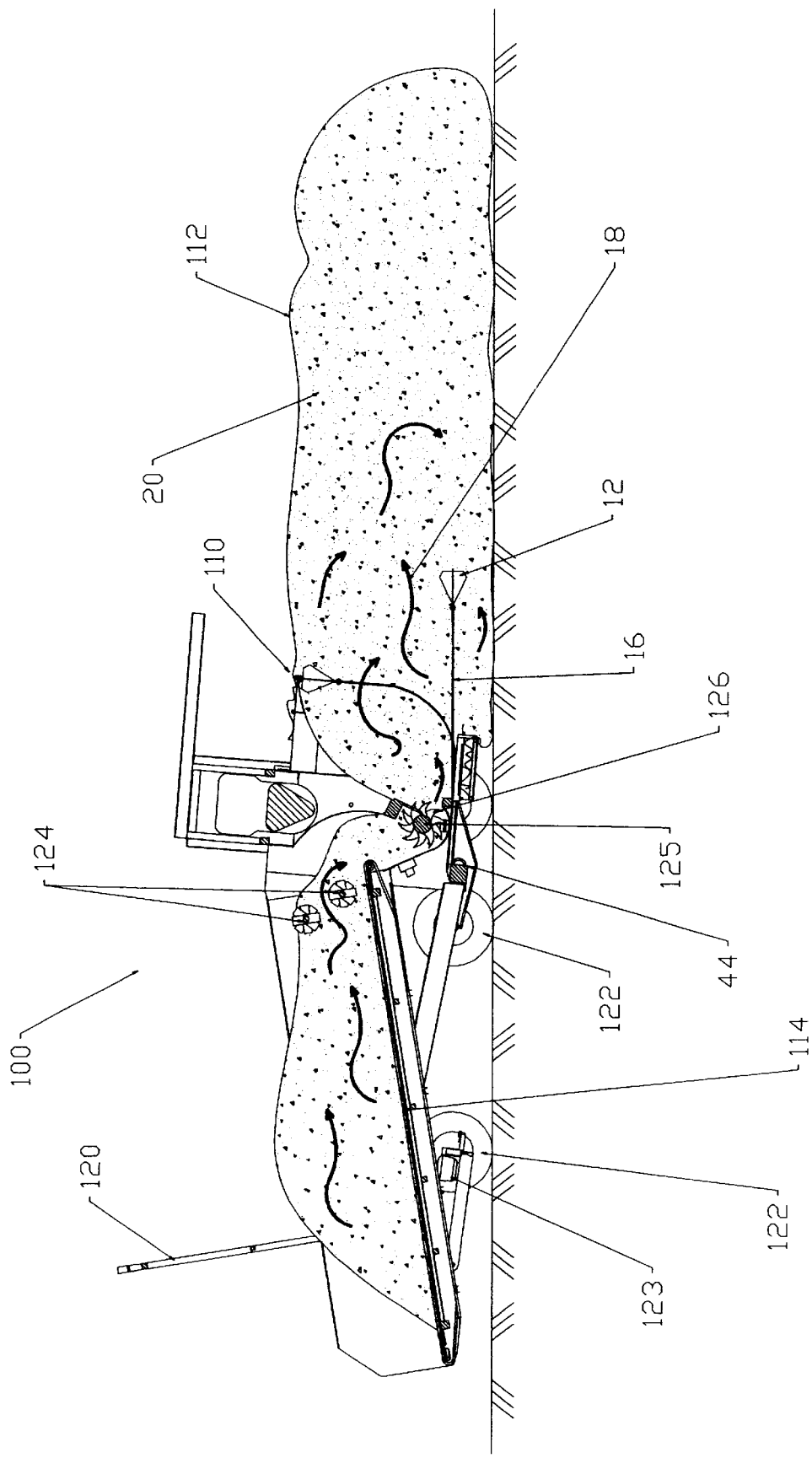
FIG. 4 is a side elevation view, in section, of the agricultural feed bagger illustrated in FIG. 1, with the braking apparatus in an operative position deployed in a flow stream of agricultural feed.

Referring to FIG. 1, there is illustrated an agricultural feed bagger, generally indicated by reference numeral 100. Agricultural feed bagger 100 has a frame 102. Frame 102 includes a tunnel 104 with an intake end 106 for receiving material to be bagged and an output end 108. Referring to FIG. 4, it can be seen how output end 108 is adapted to receive an open mouth 110 of an agricultural bag 112. The configuration for agricultural feed bagger 100 varies between manufacturers. Referring to FIG. 1, the configuration illustrated has a conveyor deck 114 that conveys agricultural feed into intake end 106 of tunnel 104. Frame 102 has a first end 116 and a second end 118. A tow bar 120 is positioned at second end 118 of frame 102, in order to permit agricultural feed bagger 100 to be towed in a transport mode. Frame 102 is supported upon ground engaging wheels 122. Ground engaging wheels 122 each are equipped with wheel brakes 123. It is preferred, but not essential, that these wheel brakes be capable of being individually applied. This enables agricultural feed apparatus 100 to be "steered" by selectively applying the wheel brakes. Referring to FIG. 4, agricultural feed 20 is moved from along conveyor deck 114 and then directed into intake end 106 of tunnel 104 by rotatably mounted feed rollers 124 and feed rotor 125 that have outwardly projecting feed engaging blades 126. Feed rollers 124 and feed rotor 125 serve much different functions. Feed rollers 124 serve to fluff up the material and break up any clumps or lumps, so the agricultural feed flows freely. Feed rotor 125 serves to force the material into tunnel 104.

Braking apparatus 10 includes a body 12 at a remote end 14 of a linkage. The linkage illustrated is a tethering line 16. In FIG. 1, tethering line 16 and body 12 are shown in a transport mode. Referring to FIG. 4, body 12 is also illustrated in an operative mode in which tethering line 16 is taut and extends outwardly from frame 102 positioning body 12 into a flow stream, indicated by arrows 18, of agricultural feed 20 entering open mouth 110 of agricultural bag 112, as will hereinafter be further described.

Figure 2:
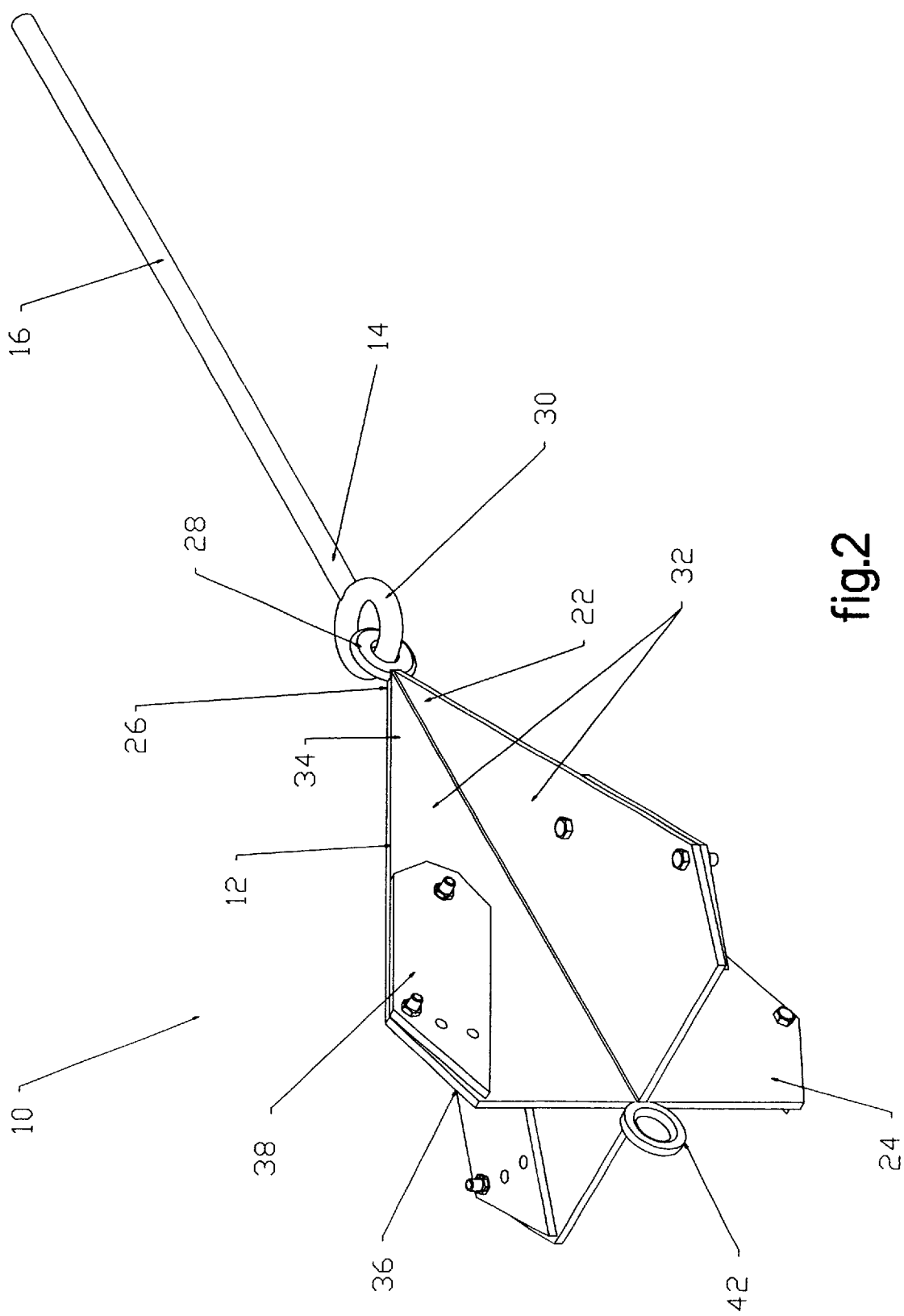
FIG. 2 is a detailed perspective view of the braking apparatus illustrated in FIG. 1, with extendible fins in a retracted position.
Figure 3:
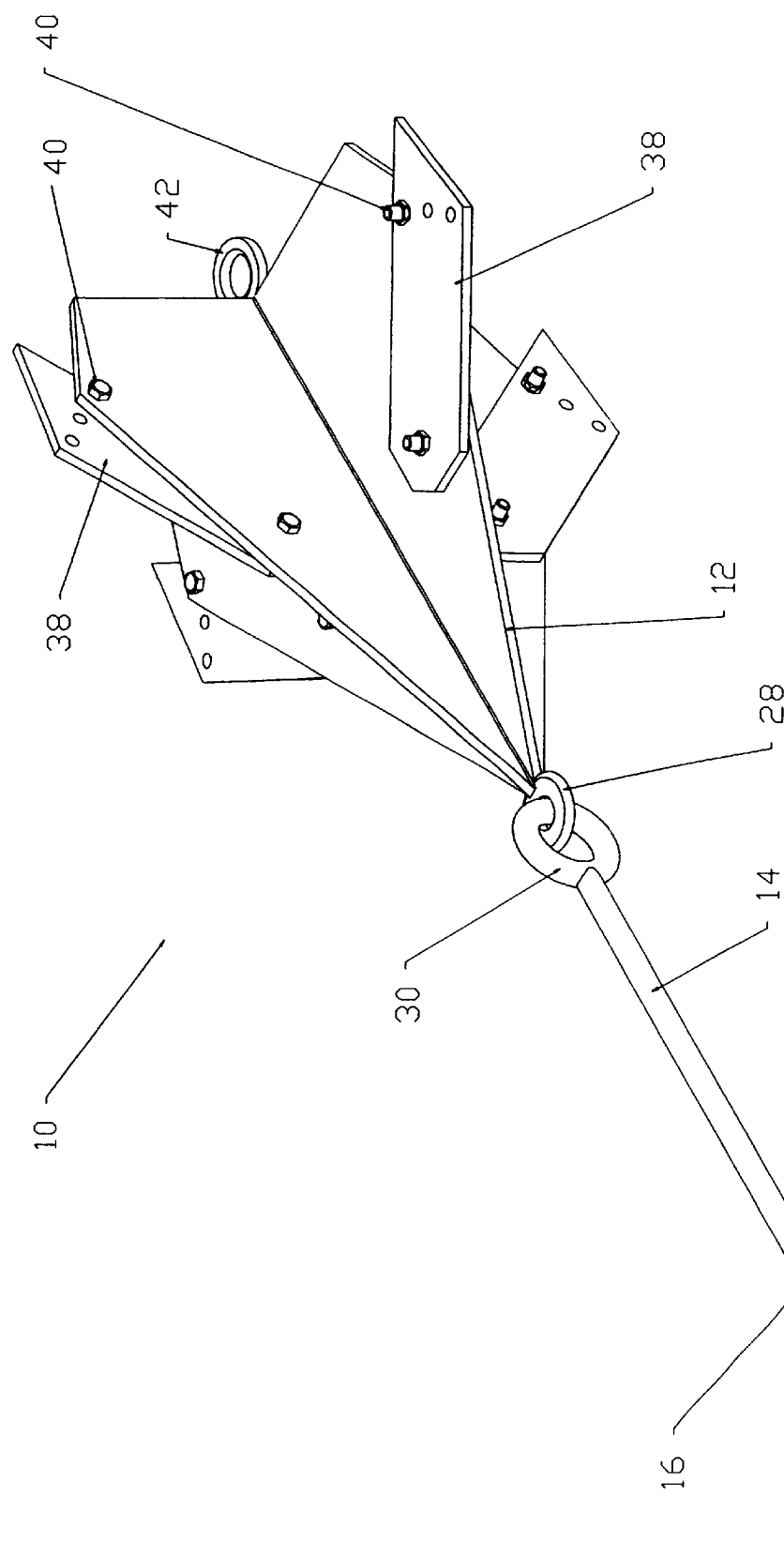
FIG. 3 is a detailed perspective view of the braking apparatus illustrated in FIG. 1, with extendible fins in an extended position.

Referring to FIG. 2, body 12 is illustrated in greater detail. Body 12 has a first end 22 and a second end 24. Body 12 has a point or apex 26 at first end 22. Positioned at point or apex 26 is an attachment ring 28, to which tethering line 16 attaches. In view of the forces exerted, tethering line 16 is generally made out of steel cable. Tethering line 16 also has an attachment ring 30, which mates with attachment ring 28 on body 12. Body 12 diverges outwardly from first end 22 to second end 24. Rather than have a solid body, body 12 consists of several conjoined fins 32. Each of fins 32 has a leading edge 34 and a trailing edge 36. Fins 32 diverge outwardly from leading edge 34 to trailing edge 36, thereby giving body 12 its shape. Attached to each of fins 32 are fin extensions 38. Fin extensions 38 have a range of extendible positions, one of which is illustrated in FIG. 3, and a retracted position, illustrated in FIG. 2. Fin extensions 38 are held in the selected position by bolts 40. A secondary attachment ring 42 is provided at second end 24 of body 12, in order that body 12 may be suspended from frame 102 to assume a transport position, illustrated in FIG. 1. Referring to FIG. 4, a retracting mechanism 44 is provided to retract tethering line 16 after it has been fed out by the flow of agricultural feed. There are various forms of retracting mechanism 44 that can be used, such as a winch or hydraulic cylinder.

The use of apparatus 10 to brake agricultural feed bagger 100 will now be described with reference to FIGS. 1 through 4. In advance of using apparatus 10, a decision is made as to the amount of braking force required in view of the condition of the field as well as the type of agricultural feed being processed. It is known that in wet conditions, the wheel brakes will be subject to a greater degree of slippage and, as such, more drag may be required from body 12. If required, fin extensions 38 are deployed, as is illustrated in FIG. 3. Referring to FIG. 4, in the transport position body 12 is suspended on a peg from frame 102. Agricultural bag 112 is secured to output end 108 of tunnel 104. Agricultural feed 20 is dumped onto conveyor deck 114 and is carried up conveyor deck 114. Agricultural feed is "fluffed up" by feed rollers 124 and directed forcibly through tunnel 104 by feed rotor 125. The flow of agricultural feed 20 through tunnel 104 dislodges body 12 from its transport position and carries body 12 into agricultural bag 112. The progress of body 12 into agricultural bag 112 is halted when tethering line 16 becomes taut. The flow of agricultural feed 20 acting against body 12 serves to slow the forward progress of agricultural bagger 100. The reason for this is that the force exerted by the flow of agricultural feed 20 against body 12 is transmitted, via tethering line 16, to frame 102. During operation the braking force can be adjusted, as may be required, through the use of retracting mechanism 44. Retracting mechanism 44 is capable of extending or retracting tethering line 16, thereby altering the position of body 12 in the flow stream. As a general rule, the farther into the flow stream body 12 is positioned, the greater the braking force. Retracting mechanism 44 also enables body 12 to be retracted when agricultural bag 112 is or is close to being full. Referring to FIG. 2, the shape of body 12 promotes a flow of agricultural feed around body 12 from first end 22 to second end 24. The fact that body 12 consists of conjoined fins 32, enables agricultural feed 20 to flow around body 12 without forming voids behind. Of course, the presence of a void passage through agricultural feed 20 in agricultural bag 112 might facilitate the circulation of air through agricultural feed 20 leading to spoilage.

It will be apparent to one skilled in the art the benefits of using apparatus 10 to apply a braking force to agricultural feed bagger 100. It will also be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A method for braking an agricultural feed bagger, comprising the steps of:
   providing an agricultural feed bagger having a frame that includes a tunnel with an intake end for receiving material to be bagged and an output end adapted to receive an open mouth of an agricultural bag;
   suspending a body in a transport position above ground at the output end of the tunnel, the body being secured to a free-unattached end of a linkage which is secured to the frame at the linkage's other end;
   initiating a flow of agricultural feed through the tunnel, the flow of agricultural feed carrying the body from the transport position into an operative position in which the linkage extends outwardly from the frame into a flow stream of agricultural feed entering the open mouth of the agricultural bag, such that the flow of agricultural feed acting against the body serves to slow the forward progress of the agricultural bagger, as the force exerted against the body is transmitted, via the linkage, to the frame.

2. The method as defined in claim 1, the linkage being a tethering line.

3. The method as defined in claim 1, means being provided to extend and retract the linkage, thereby altering the position of the body in the flow stream.

4. The method as defined in claim 1, the body having several fins.

5. The method as defined in claim 4, each of the fins having a leading edge, a trailing edge, the fins diverging outwardly from the leading edge to the trailing edge, thereby providing improved fluid dynamics.

6. The method as defined in claim 1, the body having a first end, a second end, the body diverging outwardly from the first end to the second end, thereby providing improved fluid dynamics.

7. The method as defined in claim 4, the fins having extendible and retractable fin extensions, thereby enabling the amount of drag provided by the body to be adjusted.

8. A method for braking an agricultural feed bagger, comprising the steps of:

providing an agricultural feed bagger having a frame that includes a tunnel with an intake end for receiving material to be bagged and an output end adapted to receive an open mouth of an agricultural bag;

suspending a body in a transport position above ground at the output end of the tunnel, the body being secured to a free-unattached end of a tethering line which is secured to the frame at the tethering line's other end;

initiating a flow of agricultural feed through the tunnel, the flow of agricultural feed carrying the body from the transport position into an operating position in which the tethering line extends outwardly from the frame into a flow stream of agricultural feed entering the open mouth of the agricultural bag, such that the flow of agricultural feed acting against the body serves to slow the forward progress of the agricultural bagger, as the force exerted against the body is transmitted, via the tethering line, to the frame, a retracting mechanism being provided to retract the tethering line thereby altering the position of the body in the flow stream.

9. The method as defined in claim 8, the body having a first end, a second end, and several outwardly projecting fins, each of the fins having a leading edge, a trailing edge, the fins diverging outwardly from the leading edge to the trailing edge, thereby providing improved fluid dynamics.

10. The method as defined in claim 9, the fins having extendible and retractable fin extensions, thereby enabling the amount of drag provided by the body to be adjusted.

11. An apparatus for braking an agricultural feed bagger, comprising in combination:

an agricultural feed bagger having a frame that includes a tunnel with an intake end for receiving material to be bagged and an output end adapted to receive an open mouth of an agricultural bag;

means for suspending a body in a transport position above ground at the output end of the tunnel, the body being secured to a free, unattached end of a linkage which is secured to the frame at the linkage's other end and which body in an operative position extends outwardly from the frame into a flow stream of agricultural feed entering the open mouth of the agricultural bag, such that the flow of agricultural feed acting against the body serves to slow the forward progress of the agricultural bagger, as the force exerted against the body is transmitted, via the linkage, to the frame.

12. The apparatus as defined in claim 11, wherein the linkage is a tethering line.

13. The apparatus as defined in claim 11, wherein means is provided to extend and retract the linkage, thereby altering the position of the body in the flow stream.

14. The apparatus as defined in claim 11, wherein the body has several fins.

15. The apparatus as defined in claim 11, wherein the body has a first end, a second end, and diverges outwardly from the first end to the second end.

16. The apparatus as defined in claim 14, wherein each of the fins has a leading edge, a trailing edge, the fins diverging outwardly from the leading edge to the trailing edge.

17. The apparatus as defined in claim 14, wherein the fins having extendible and retractable fin extensions, thereby enabling the amount of drag provided by the body to be adjusted.

18. An apparatus for braking an agricultural feed bagger, comprising in combination:

an agricultural feed bagger having a frame that includes a tunnel with an intake end for receiving material to be bagged and an output end adapted to receive an open mouth of an agricultural bag;

means for suspending a body in a transport position above ground at the output end of the tunnel, the body being secured to a free-unattached end of a tethering line which is secured to the frame at the tethering line's other end and which body in an operative position extends outwardly from the frame into a flow stream of agricultural feed entering the open mouth of the agricultural bag, such that the flow of agricultural feed acting against the body serves to slow the forward progress of the agricultural bagger, as the force exerted against the body is transmitted, via the tethering line, to the frame, a retracting mechanism being provided to retract the tethering line thereby altering the position of the body in the flow stream.

19. The apparatus as defined in claim 18, wherein the body has several fins.

20. The apparatus as defined in claim 18, wherein the body has a first end, a second end, and diverges outwardly from the first end to the second end.

21. The apparatus as defined in claim 19, wherein each of the fins has a leading edge, a trailing edge, the fins diverging outwardly from the leading edge to the trailing edge.

22. The apparatus as defined in claim 19, wherein the fins having extendible and retractable fin extensions.

* * * * *